UNITED STATES PATENT OFFICE.

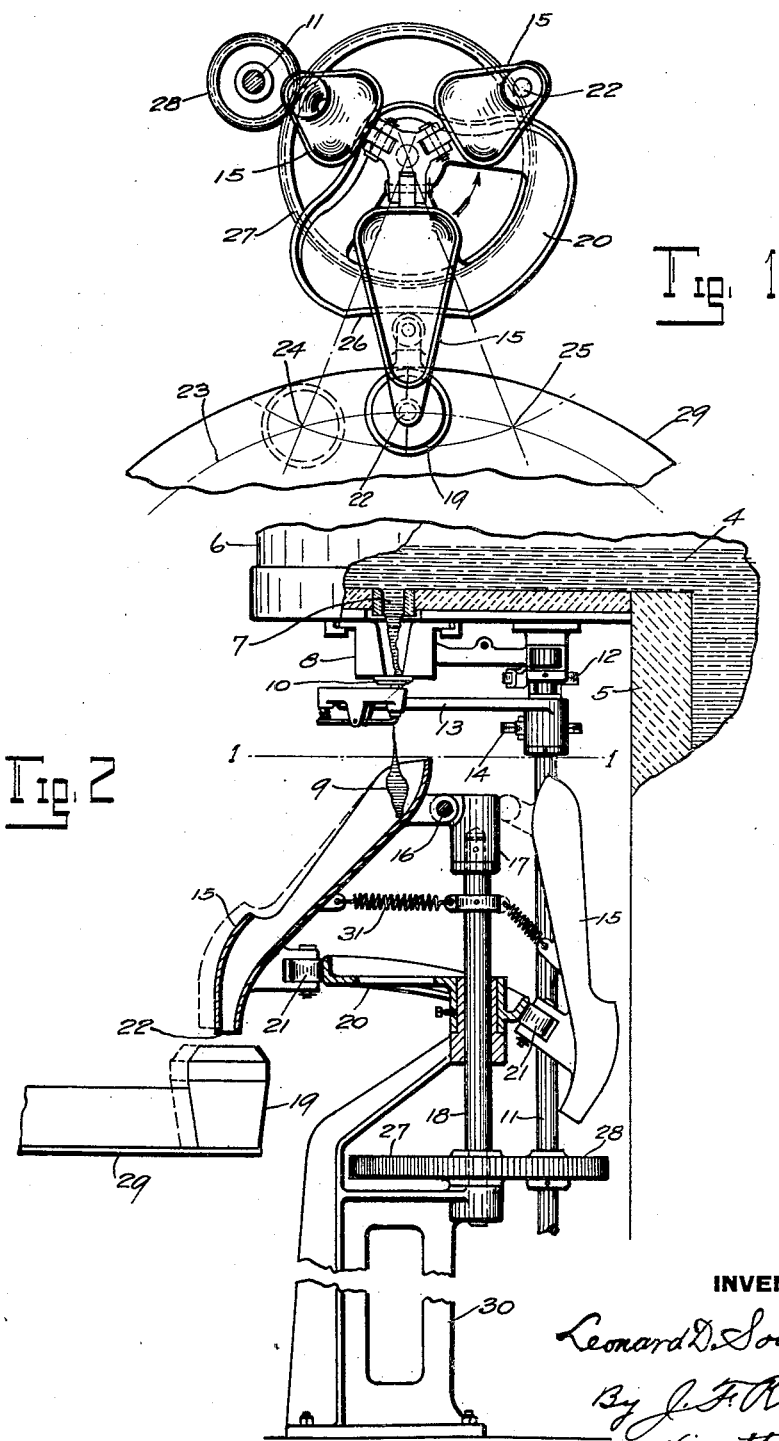

LEONARD D. SOUBIER, OF TOLEDO, OHIO, ASSIGNOR TO THE OWENS BOTTLE MACHINE COMPANY, OF TOLEDO, OHIO, A CORPORATION OF OHIO.

MEANS FOR TRANSFERRING MOLTEN GLASS TO MOLDS.

1,331,536.  Specification of Letters Patent.  Patented Feb. 24, 1920.

Application filed July 8, 1918. Serial No. 243,858.

*To all whom it may concern:*

Be it known that I, LEONARD D. SOUBIER, a citizen of the United States, residing at Toledo, in the county of Lucas and State of Ohio, have invented new and useful Improvements in Means for Transferring Molten Glass to Molds, of which the following is a specification.

My invention relates to means for directing charges of molten glass into molds or receptacles, and is particularly designed for use with glass forming machines of the continuously rotating type.

In the manufacture of glass articles formed in molds, it has been customary to transfer the molten glass from the furnace to the molds in the form of gobs or charges of the proper size for forming the articles, or to flow the glass in a stream into the molds. A combination of these methods has also been employed. On the ordinary glass forming machines the mold tables have an intermittent rotating movement bringing the molds successively into position to receive a charge of glass, the molds being held stationary while the charge is introduced.

A continuously rotating machine is more rapid in operation than an intermittent machine and possesses important mechanical advantages. With such a machine, however, the molds are not stopped at the charging point, so that it is difficult or impossible to drop the glass into the mold unless special provision is made for guiding the glass. An object of the present invention is to overcome this difficulty by providing a practical means to guide the glass into the moving molds, such guiding means being operative during a considerable movement of the molds.

In its preferred form the invention comprises a series of inclined troughs revolving continuously about a vertical axis. As each mold approaches the charging station a trough is brought into register therewith and travels with the mold for a substantial distance. During this time the upper end of the trough remains directly beneath the gob discharging point, so that the gobs are accurately directed into the molds while permitting considerable variation in the time of discharging the gob.

Other features of the invention and the exact nature thereof will appear more fully hereinafter.

Referring to the accompanying drawing: Figure 1 is a sectional plan view at the plane of the line 1—1 on Fig. 2, showing means for directing the glass into the molds Fig. 2 is a part sectional elevation of the apparatus.

The molten glass 4 (Fig. 2) may be supplied from a continuous melting furnace 5 from which it flows into a boot 6. The glass flows in a continuous stream through an opening 7 in the bottom of the boot into a sectional cup 8, in which it accumulates to form gobs or charges 9. A knife 10 forms a temporary bottom for the cup 8. When a portion of the charge has accumulated in the cup the knife is withdrawn, and later the cup opens, allowing the accumulated charge to drop. The cup then closes and the knife operates to sever the discharged gob from the flowing stream of glass and closes the bottom of the cup so that another charge will accumulate. The mechanism for operating the divided cup and knife may be the same as disclosed in the co-pending application of J. B. Graham, Serial Number 174,697. This mechanism comprises a continuously rotating shaft 11 carrying a cam 12 which operates the cup sections 8. The knife 10 is mounted on an arm 13 which is operated by a cam 14 mounted on the shaft 11, which makes one complete revolution for each charge of glass.

Molds 19 carried on a continuously rotating mold table 29 are brought successively to charging position. In order to lengthen the time that the molds are in position to receive a charge and to accurately guide the glass into the molds, guiding devices preferably in the form of troughs or chutes 15 are provided. Each trough is pivoted on a pin 16 carried in a bracket 17, which is mounted on a continuously rotating vertical shaft 18, whereby the troughs are caused to revolve continuously about a vertical axis. The shaft 18 is driven from the cam shaft 11 through gears 27 and 28 mounted on the shafts 18 and 11 respectively. This drive shaft 11 is operated in synchronism with the rotating mold table 29 so that the guides 15 are brought in successive order into direct register with the molds. The path of travel of the lower or discharging end of the trough 15 is controlled by a stationary cam 20 mounted on a standard 30, on which the shaft 18 is also supported. The guides have cam rollers 21 mounted thereon, which are held in position against the cam surface by tension springs 31.

Referring to Fig. 1, it will be seen that the cam 20 is so shaped that it causes the guide 15 to remain in register with the mold 19 while traveling through an arc of some length. For this purpose the cam 20 is formed with a reëntrant portion 26 substantially concentric with the arc 23 in which the mold travels. The discharge opening 22 of the guide remains in register with the mold while it traverses the arc 23 between the points 24 and 25, these points being at the intersection of the arc and radial lines extending from the center of rotation of the guide 15, said radial lines intersecting the cam 20 at the ends of the reëntrant section 26. The cam 20 is so shaped that it permits the chute 15 to drop to a vertical position after it has passed beyond the mold table, thereby allowing the apparatus to be used in a limited amount of space. The guides are so designed as to allow a charge of glass 9 to be dropped onto a guide when or before it reaches the point 24, thereby giving considerable distance, during which a charge may enter the mold. That is to say, the upper end of the chute is broadened and is comparatively close to its center of rotation, so that it remains in receiving position beneath the cup 8 while the discharge end 22 is in register with the mold.

The present invention provides a means for accurately guiding the charge of glass into the mold even when the transfer of the charge takes place before or after the mold has reached the point nearest the gob forming cup.

Modifications may be resorted to without departing from the spirit and scope of my invention.

What I claim is:

1. The combination with a series of continuously rotating molds, of means for supplying charges of glass, a series of inclined chutes revoluble about a vertical axis, and arranged to have their upper ends brought successively into position to receive a charge of glass, and means for swinging the lower end of each chute into register with a mold and maintaining it in register therewith while the latter traverses an arc of predetermined length.

2. The combination with a series of molds moving continuously in a closed path, of a series of chutes, a carrier on which said chutes are mounted, means to rotate said carrier and thereby bring the upper ends of the chutes successively into position to receive a charge of glass, and means for guiding the lower ends of the chutes and causing each chute to register with a mold during a predetermined portion of its travel.

3. The combination with a series of molds revolving about a vertical axis, of means for supplying charges of molten glass, means for transferring the charges to the molds; said transferring means comprising a carrier, downwardly and outwardly inclined chutes pivoted adjacent their upper ends to the carrier, means for rotating the carrier and thereby bringing the upper ends of the chutes successively into position to receive charges of glass while the lower ends of the chutes are brought in register with and directly over the molds, and means for guiding the chutes to maintain each chute in register with a mold while the latter travels a predetermined distance.

4. The combination with a series of molds revolving about a vertical axis, of means for supplying charges of molten glass, means for transferring the charges to the molds; said transferring means comprising a carrier, downwardly and outwardly inclined chutes pivoted adjacent their upper ends to the carrier, means for rotating the carrier and thereby bringing the upper ends of the chutes successively into position to receive charges of glass, and a cam by which each chute is guided and its discharge end caused to travel in register with the mold while the latter is passing the charging station.

5. The combination with a series of molds revolving about a vertical axis, of means for supplying charges of molten glass, means for transferring the charges to the molds; said transferring means comprising a carrier, downwardly and outwardly inclined chutes pivoted adjacent their upper ends to the carrier, means for rotating the carrier and thereby bringing the upper ends of the chutes successively into position to receive charges of glass, and a cam arranged to guide the lower ends of the chutes, said cam formed with a section substantially concentric with the path of movement of the molds and positioned to hold the lower end of each chute in register with a mold therebeneath while passing the charging station.

6. The combination with a series of continuously rotating molds, of means for supplying charges of glass, means for directing the charges to the molds; said directing means comprising a carrier rotatable about a vertical axis, a chute pivoted adjacent its upper end to said carrier to swing about a horizontal axis and extending downwardly and outwardly from the carrier, the chute arranged to travel in a closed path around said vertical axis and have its upper end brought by the rotation of the carrier periodically beneath the said supply means to receive a charge of glass, and means for guiding the lower end of said chute to maintain it by a combined movement about said horizontal and vertical axes in register with the mold while the latter is in proximity to the charging station.

7. The combination with a series of continuously rotating molds, of means for supplying charges of glass, means for directing the charges to the molds; said directing means comprising a carrier rotatable about a vertical axis, a chute pivoted adjacent its upper end to said carrier and extending downwardly therefrom, and means for guiding the lower end of said chute to move it radially outward and maintain it in register with a mold while the latter is passing a charging station, and permitting the chute to swing inward when it has passed beyond the mold charging position.

8. The combination with a series of continuously rotating molds, of means for supplying charges of glass, means for directing the charges to the molds; said directing means comprising a carrier rotatable about a vertical axis, a chute pivoted adjacent its upper end to said carrier to swing about a horizontal axis and extending downwardly from its pivot, means to guide the lower end of the chute and maintain it in register with a mold during a portion of its rotation, the upper end of the chute being brought periodically to charge receiving position and widened so that it is maintained in receiving position throughout the period during which the chute registers with the mold.

9. The combination of means to supply molten glass, and means for guiding the glass to molds or receptacles; said means comprising a vertical shaft, means for rotating the shaft, a series of chutes having a pivotal connection adjacent their upper ends with said shaft, and means for guiding said chutes to swing the lower ends thereof outwardly to a discharging position during a portion of their revolution, and permitting them to swing inwardly to a substantially vertical or pendant position when beyond said charging position.

10. The combination with a series of continuously rotating molds, of means for supplying charges of glass, a series of inclined chutes, a carrier rotatable continuously about a vertical axis and on which said chutes are mounted to rotate continuously in the same closed path, said chutes arranged to have their upper ends brought successively into position to receive a charge of glass, and means to swing the lower end of each chute into register with a mold and maintain it in register therewith while the latter traverses an arc of predetermined length.

11. The combination with a series of molds moving continuously in a closed path and brought successively to the same charging position, of a series of chutes, a rotatable carrier on which said chutes are mounted and arranged around its axis of rotation, the upper ends of the chutes being successively brought by said rotation into position to receive a charge of glass, and means for guiding the lower ends of the chutes and causing each chute to register with a mold at said mold charging position during a predetermined portion of its travel.

12. The combination with means for supplying charges of molten glass, of mechanism for transferring said charges, comprising a carrier rotatable about a vertical axis adjacent to the point of supply, a series of inclined chutes mounted on said carrier with their upper ends adjacent to said axis and arranged to be brought periodically and successively beneath the supply means to receive the glass, whereby the receiving ends of the chutes are carried slowly past the receiving point while the discharge ends move more rapidly.

13. The combination with means for supplying charges of molten glass, of a series of molds brought successively into position to receive the charges, transfer mechanism comprising a carrier rotatable about a vertical axis in proximity to the point of supply, a series of downwardly and outwardly inclined chutes pivotally mounted on said carrier with their upper ends adjacent said axis and arranged to be periodically brought to charge receiving position by the rotation of the carrier, the receiving ends of the chute being widened to present a broad receiving surface moving slowly past the supply point, and means for guiding the lower ends of the chutes and thereby maintaining each chute in register with a mold while the latter travels a predetermined distance.

14. The combination with means to supply charges of molten glass, of an inclined trough having a broad upper receiving end tapering to a narrow discharge end, and means to rotate the trough in a closed path about a vertical axis, the upper end of the trough being adjacent said axis and brought periodically beneath the point of supply.

Signed at Toledo, in the county of Lucas and State of Ohio, this 3d day of July, 1918.

LEONARD D. SOUBIER.